US007965488B2

(12) United States Patent
Kaufman

(10) Patent No.: US 7,965,488 B2
(45) Date of Patent: Jun. 21, 2011

(54) METHODS OF REMOVING AEROSOLS FROM THE ATMOSPHERE

(75) Inventor: Phillip Kaufman, Bedford, MA (US)

(73) Assignee: Ionogenics Corp., San Diego, CA (US)

( * ) Notice: Subject to any disclaimer, the term of this patent is extended or adjusted under 35 U.S.C. 154(b) by 255 days.

(21) Appl. No.: 11/983,631

(22) Filed: Nov. 9, 2007

(65) Prior Publication Data

US 2008/0283386 A1 Nov. 20, 2008

Related U.S. Application Data

(63) Continuation-in-part of application No. 10/719,565, filed on Nov. 20, 2003, now abandoned.

(51) Int. Cl.

*H01T 23/00* (2006.01)
*A01G 15/00* (2006.01)
*H01Q 9/34* (2006.01)
*H01Q 1/36* (2006.01)
*F25C 3/04* (2006.01)
*H01Q 11/06* (2006.01)
*H01Q 13/00* (2006.01)

(52) U.S. Cl. ...... 361/231; 239/14.1; 239/14.2; 343/736; 343/773; 343/874; 343/896; 343/897

(58) Field of Classification Search .......... 361/231–235; 239/14.1, 14.2; 343/736, 773, 874, 896, 343/897
See application file for complete search history.

(56) References Cited

U.S. PATENT DOCUMENTS

| | | | | |
|---|---|---|---|---|
| 945,475 | A * | 1/1910 | Pfund | 343/849 |
| 1,193,848 | A * | 8/1916 | Van Horn | 174/2 |
| 1,221,723 | A * | 4/1917 | Guichard | 52/115 |
| 1,617,788 | A * | 2/1927 | Baldwin et al. | 174/2 |
| 2,508,657 | A * | 5/1950 | Toller-Bond | 343/874 |
| 3,386,098 | A * | 5/1968 | Mullaney | 343/752 |
| 5,912,396 | A * | 6/1999 | Wong | 204/157.3 |

* cited by examiner

*Primary Examiner* — Jared J Fureman
*Assistant Examiner* — Scott Bauer
(74) *Attorney, Agent, or Firm* — Edwards Angell Palmer & Dodge LLP; Ralph A. Loren; Amy DeCloux

(57) ABSTRACT

An antenna is disclosed to efficiently ionize the atmosphere for the purpose of reducing the aerosol counts, and therefore the number of poluted particles in suspension in the atmosphere, by deposition to ground. The antenna includes peripheral nodes and a central node. Each of the peripheral nodes is connected to adjacent peripheral nodes through peripheral spokes. The peripheral nodes are also connected to the central node through radial spokes. Electric power is applied to the peripheral spokes and the radial spokes causing the antenna to charge the atmosphere through the emission of ions. The antenna minimizes an attenuation factor that reduces ionization efficiency and reduces the land requirements for its installation.

16 Claims, 11 Drawing Sheets

METHODS OF REMOVING AEROSOLS FROM THE ATMOSPHERE

REFERENCE TO RELATED APPLICATIONS

This application is a continuation-in-part of U.S. patent application Ser. No. 10/719,565, entitled "Ionization Antenna", the contents of which are incorporated herein by reference.

FIELD OF THE INVENTION

The present invention relates generally to methods of removing aerosols or particulates, such as suspension of polluted aerosols, from the atmosphere. More particularly, the invention relates to methods for electrifying the atmosphere with ion emissions by corona effect to remove unwanted aerosols or particulates by deposing these aerosols to ground.

BACKGROUND OF THE INVENTION

In the late 1950's Dr. Bernard Vonnegut, after having invented the silver-iodide flare in 1948 that was used for cloud seeding, and still is, almost 60 years later, pioneered ionization technology by conducting experiments that produced unipolar corona effect ions using a direct current power supply feeding high voltage to a long, thin wire electrically isolated from ground. He was able to detect ions as far as 10 miles away from his ionization station[(1)]. Vonnegut was attempting to discover what artificial ionization's effect would be on weather modification. Lacking modem instrumentation, he was unable to measure significant effects The present invention is based, in part, on recent atmospheric physics research that has established that natural ions are a catalyst that will allow more particles to be generated via by lowering nucleation barriers and electrically charging new or existing particles in suspension in the atmosphere (aerosols, causing them to grow more aggressively. The larger mass of the growing aerosols increases their vertical velocity due to gravitational pull, ultimately depositing these aerosols to ground and thus removing them from the atmosphere.

Based on recent physics research and on Vonnegut's efforts, an attempt was made to see if artificially generated, direct current, corona effect (CE), ionization would act in much the same way as cosmic ray ionization, with some differences that might make unipolar CE ions more effective. Experiments show that use of the ionization station of the present invention significantly reduces the atmospheric aerosol counts.

Recent Ion-Aerosol Research

Several prominent atmospheric physicists in Europe and in the United States have published a number of papers over the last 10 years that establish a link between naturally occurring ionization and aerosol nucleation and growth.

Researchers started getting reliable satellite imagery of the Earth's surface about a decade ago. This imagery lead a Swedish research team to study the intensity of the flux of galactic cosmic rays (GCR) comparing it to images of Earth's cloud cover and they positively correlated GCR flux intensity to the Earth's cloud cover[(2)]. Later British and American scientists refined that correlation specifically to low cloud cover[(3,4)].

Natural atmospheric ionization is ubiquitous. Ion pairs are continually produced in the atmosphere by radiolysis of air molecules, which is mainly caused by Galactic Cosmic Rays (GCR), radon isotopes and terrestrial gamma radiation. The ions produced are rarely single species but clusters of water molecules around a central ion[(5)].

The generation or nucleation process is described as the process whereby two or more molecules, one of them being water, merge to form a particle in suspension, or aerosol. It is now evident that cosmic ray ionization is linked to lowering nucleation barriers, thus forming ultrafine aerosols, some of which can become Cloud Condensation Nuclei (CCN)[(3)]. Nucleation is theoretically accomplished through four mechanisms:

1. Binary Nucleation: The water molecule reacts with any other molecule, such as ammonium, hydrochloric acid, nitric acid, etc.
2. Ternary Nucleation: The water molecule reacts with two other molecules, which can be organic or inorganic
3. Ion Induced Nucleation: The water molecule reacts with another organic or inorganic molecule plus an ion
4. Ion Mediated Nucleation: The water molecule reacts with two or more electrically charged organic or inorganic molecules. This is called "mediated" because the ions have previously electrically charged the nucleating molecules.

The two primary nucleation mechanisms that have been used to explain the observed nucleation events occurring in Earth's atmosphere are ternary nucleation and, preferentially, ion mediated nucleation[(6)].

Aerosols, once formed, grow through one or more of several processes:

1. Coagulation—The particle grows by attachment of molecules (ligands) onto the aerosol by agglomeration.
2. Condensation—Water molecules can condense on an aerosol, changing phase from gaseous to liquid and releasing latent heat. The aerosol grows as it acquires water molecules, adding to its diameter and mass. The charged aerosols are more effective in inducing condensation than uncharged ones because polar molecules have an enhanced condensation rate. Calculations show that this growth rate for charged particles is greater by a factor of at least 2 than it is for uncharged particles, and since a 5 nanometer ($nm=1\times10^{-9}$ meter) particle's coagulation loss rate is $1\frac{1}{20}^{th}$ that of a 1 nm particle, it is an important factor in determining the early survival rate of aerosol[(3)].
3. Scavenging: The process whereby a cloud droplet collects an aerosol. If the aerosol is charged, the charge transfers to the droplet. The charged droplet will be further attracted to charged aerosols.
4. Electroscavenging: When a cloud droplet reaches the clear air—cloud boundary it often evaporates, leaving behind all its charge to the nucleus as well as coatings of sulfate, pollutants and organic compounds that the droplet absorbed while in the cloud. Charged evaporation nuclei enhance collection by droplets because of their coatings and because they create an image charge on the droplet. Even if the droplet is charged with the same polarity as the nucleus, the image charge will greatly enhance the possibility of attachment. Although there is a long-range repulsion between charges of the same sign, the flow carries particles in the 0.1 μm to 1 μm range against that repulsion close to a cloud droplet, so that the short range attractive force due to the attraction between the charge of the particle and the image charge it induces in the droplet ensures particle collection[(7)].
5. Collision—Coalescence: This mechanism applies to water droplets (very large aerosols) as they fall to ground, colliding with other droplets. Larger drops fall faster than smaller drops, so they sometimes collide.

However, the air pressure of the larger, faster falling drop will, even if it is in a collision course with a smaller drop, may make the smaller drop go around the larger one and prevent collision. This is the same aerodynamic principle that causes most insects to avoid collision with an oncoming car, because the elevated air pressure surrounding the car will propel the insect away from the car. The collision efficiency of charged aerosol-droplet is increased by thirty-fold for aerosol carrying large (>50) elementary charges[(7)]. It is possible that charged droplets collide with larger falling droplets by inducing the same type of image charge over and over again until a raindrop is formed, given a sufficiently large elementary charge.

Recent work by Yu and Turco [2000] demonstrates that charged molecular clusters, condensing around natural air ions, can grow significantly faster than corresponding neutral clusters and can thus preferentially achieve stable, observable sizes[(8)]. Stable charged molecular clusters resulting from water vapor condensation and coagulation growth can survive long after nucleation. Simulations reveal that a 25% increase in ionizing rate leads to a 7-9% increase in concentrations of 3 and 10 nm particles 8 hours after nucleation[(9)].

Three specific GCR ionization processes are now theoretically established: 1) increases in the rates of aerosol coagulation, 2) lowered aerosol nucleation barriers, and 3) removal of particles by water droplets in clouds[(9)]. GCR ionization lowers nucleation barriers, allowing an ion to attach to small water molecule clusters, forming a "small ion" or the formation of more aerosols and promoting early charged particle growth into the Aitken range. There is a substantially high probability that some of the charged particles grow to the 100 nm range and beyond to become CCN. There is also evidence that electrically charged aerosols are more efficiently scavenged by cloud droplets, some of which evaporate producing evaporation aerosols, which are very effective ice formation nuclei.

In general terms, some ions will form aerosols by growing to "small ions" and then by coagulation and condensation, others will charge existing aerosols that will, again, grow by condensation and coagulation to become CCN and beyond. Still others will charge pollution aerosols and this will clean the atmosphere through scavenging[(9)].

The conclusion is that natural ionization:

a. lowers nucleation barriers, generating a larger supply of fresh aerosols
b. produces more aggressive aerosol growth through one or more of the growth mechanisms as discussed, and,
c. helps clean the atmosphere by increasing the occurrence rate of scavenging.

While it is true that the production of GCR ions is asymmetrical, it is also true that ion recombination (neutralization of charge due to attachment of ions of opposite polarity) produces a significant loss of electrical charge. Ionization from radioactive sources (radon or gamma ray) is almost symmetrical and, therefore, most of the charge induced by this type of ionization is lost by ion recombination.

On the other hand, CE ionization is unipolar, either positive or negative, but not both. Therefore, CE ions will repulse each other and not recombine. That means that every ion broadcast into the atmosphere by CE will be available to either nucleate and form an aerosol or else attach to an existing aerosol, electrically charging that aerosol.

Additionally, CE ions have been deemed to be hy groscopic[(10)] which would further contribute to induce aggressive condensation in electrically charged aerosols.

Accordingly, corona effect ionization will produce three distinct mechanisms for removing aerosols from the atmosphere by depositing them to ground:

Gravitation: Increased nucleation and aggressive growth aerosols through coagulation and condensation, which will cause aerosol deposition to ground by the increased gravitational pull caused by the aerosol's increase in mass, 1. Scavenging: This mechanism will deposit pollution aerosols to ground by attachment to water droplets, and,
2. Electrical Attraction/Repulsion: Aerosols with a positive electric charge will deposit due to electrical attraction of the ground, which is negatively charged. The opposite is also true: if the aerosol's electrical charge is negative, it will be repelled by the ground's negative charge.

SUMMARY OF THE INVENTION

The present invention provides methods for increasing the ionization levels in the atmosphere to remove unwanted aerosols or particulates such as suspended pollutants. The methods utilize an ionization station having a direct current, high voltage power supply, a thin wire antenna having an inner portion in electrical communication with an outer peripheral portion for efficient and optimal atmospheric ionization, and a monitoring and control system. The configuration of the antenna yields an attenuation factor considerably less than the ones in a conventional single straight line, "L" or "T" shaped antennas, thus increasing efficiency of ion emissions from the antenna. In addition, the more compact shape of the antenna minimizes the area required for effectiveness.

The antenna of the present invention enhances the ability to broadcast ions into the atmosphere. The antenna for broadcasting or releasing ions into the atmosphere comprises a central node coupled to a number of peripheral nodes by a conductive element such as a wire or cable. At each peripheral node, the conductive element couples that peripheral node to the central node in a radial fashion. The conductive element is also coupled to adjacent peripheral nodes forming conductive peripheral spokes. The antenna further includes a support structure to support the central node and each peripheral node. All nodes of the antenna are electrically isolated from the support structure of the antenna so that the conductive element conducts electricity. The support structure of the antenna includes vertical peripheral members to support the peripheral nodes of the antenna and a vertical central member to support the central node. The shape of the antenna is similar to an inverted cone. Direct current electric power is applied to the conductive element to release a flow of ions into the atmosphere.

The present invention beneficially reduces the size of the antenna and, consequently, the amount of land required for such an antenna. The reduced size of the antenna also simplifies the installation and maintenance of the antenna in the present invention.

DETAILED DESCRIPTION

The present invention concerns methods and systems for reducing the number of aerosols by modifying an ionization volume in the atmosphere. An antenna having a center portion electrically coupled to an outer peripheral portion framed around the center portion is employed to increase or decrease the ionization volume in the atmosphere. The antenna minimizes the attenuation which reduces ionization efficiency as a voltage is applied to the antenna, and therefore, the antenna efficiently and optimally modifies the ionization volume in the atmosphere. The antenna further reduces the amount of land required to construct such an antenna.

Figure 1:
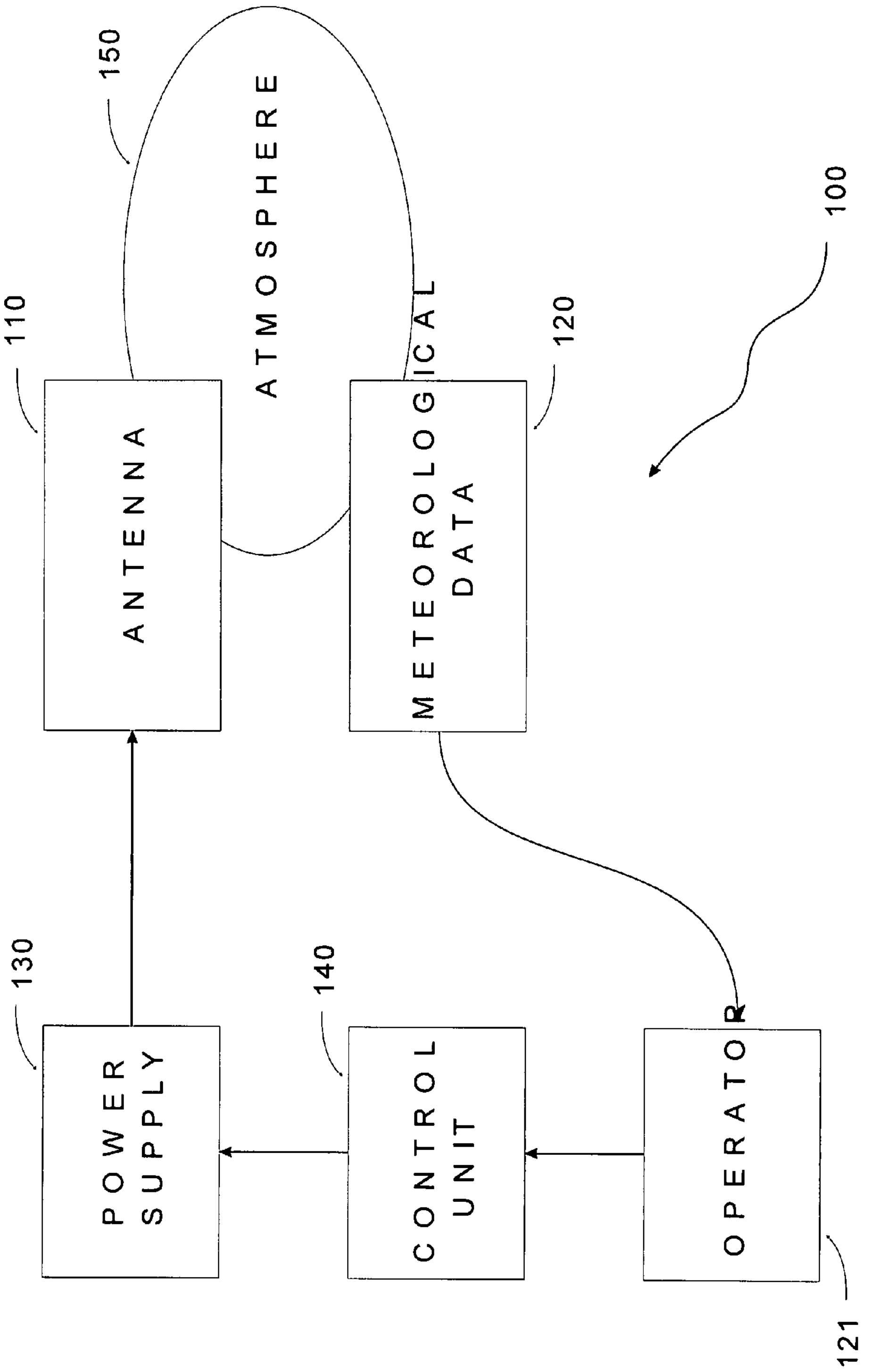
FIG. 1 is a block diagram of a system for efficiently and optimally electrifying and ionizing the atmosphere.

FIG. 1 is an exemplary block diagram of a system for electrifying and ionizing the atmosphere in accordance with the present invention. The system 100 includes an antenna 110, a power supply 130, and a control unit 140. The system 100 further includes meteorological data 120 providing weather data. The antenna 110 is exposed to the atmosphere 150 to modify a volume of charge in the atmosphere 150. System 100 further includes a weather station providing meteorological data 120 such as relative humidity to an operator 121.

The power source 130 provides electric power to the antenna 110. The power source 130 is coupled to the antenna 110 to create a flow of current through the conductive elements of the antenna 110. In this manner, when an electrical current flows through the conductive elements the antenna 110 emits a stream of charges into the atmosphere 150 to create an electric field and, in turn, positively or negatively charge the atmosphere. The electric power supplied to the antenna 110 by the power source 130 is DC (direct current) with voltages ranging from about −500 KV (kilovolts) to about +500 KV (kilovolts) and current ranging from between about 0 to about 5 A (Amperes). One suitable low-range voltage value and current value for operating the antenna 110 is about 70 KV and 2 mA. The structure of the antenna 110 will be described below in more detail with reference to FIG. 3.

As illustrated in FIG. 1, meteorological data 120 provides weather data obtained from weather stations operational in the vicinity of the system 100 as well as from weather satellites. In this manner, the meteorological data 120 can provide an indicator of current atmospheric conditions and an indicator of predicted future atmospheric conditions. As such, use of the meteorological data 120 helps facilitate an increase or decrease in the emission of ions from the antenna 110 into the atmosphere 150 to accomplish the desired reduction in aerosols. Furthermore, the operator 121 provides input to the control unit 140 to control the power source 130, and, hence an ion volume charge in the atmosphere 150. The control unit 140 controls the power source 130 based on a signal from the system operator 121, which is the result of a decision made based on analysis of the meteorological data 120, by the operator 121 to ionize the atmosphere 150 to the desired level.

Figure 2:
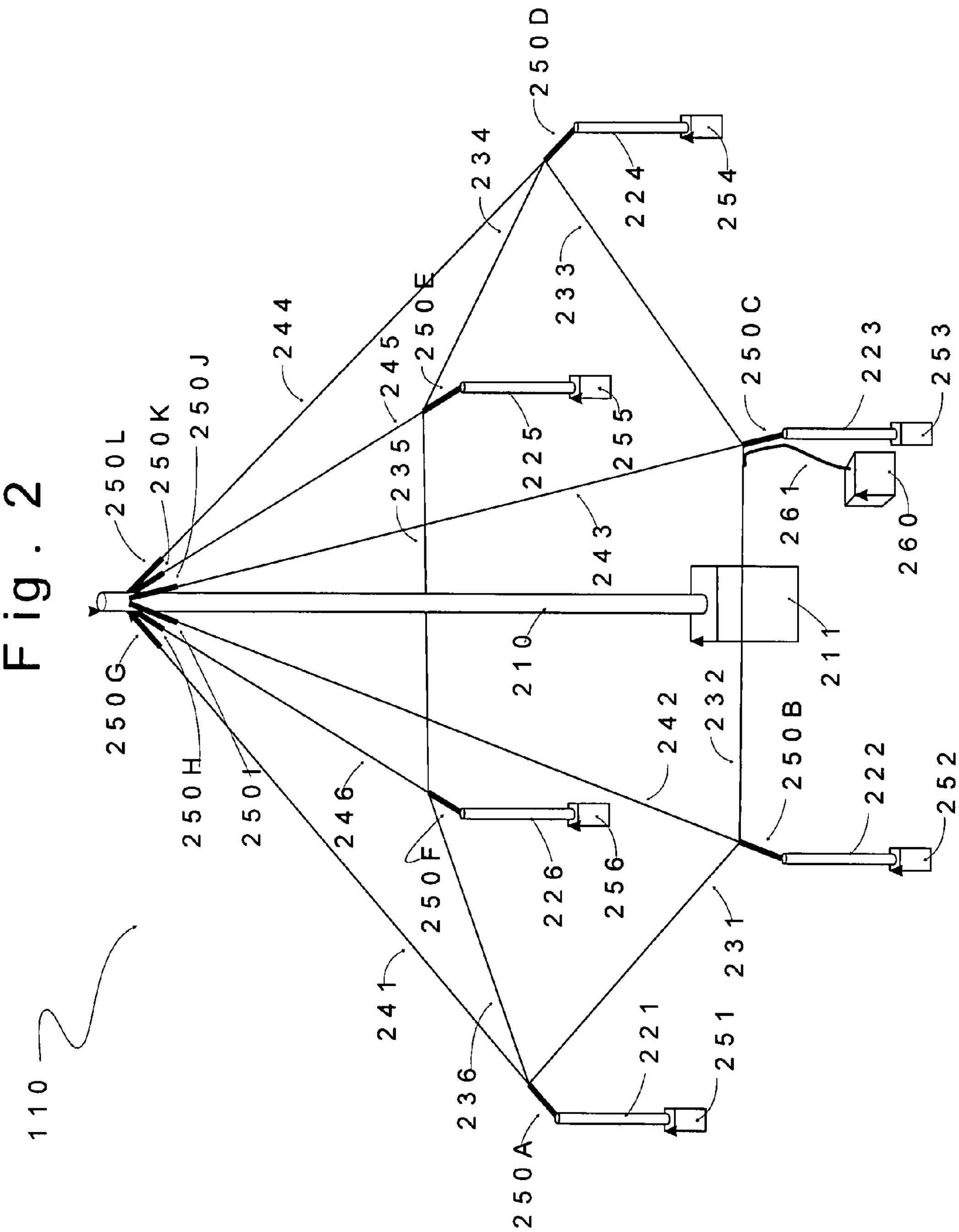
FIG. 2 is a perspective view of an exemplary antenna suitable for practicing the present invention.

FIG. 2 depicts a perspective view of an exemplary antenna of the present invention. Antenna 110 has an inverted cone-like shape and the outer perimeter or base of the antenna has a polygon-like shape, in this case hexagonal. The antenna 110 includes a central node, peripheral nodes, radial spokes 241 through 246 and peripheral spokes 231 through 236. The central node is located near the center of a polygon base 220 and includes a central tower section 210 installed on a central foundation section 211. The peripheral nodes are located at the vertices of the polygonal base 220 and include peripheral posts 221 through 226 that are installed on peripheral foundations 251 through 256. The central tower is approximately equidistant from all peripheral nodes. The radial spokes 241 through 246 connect the peripheral nodes to the central node. The peripheral spokes 231 through 236 connect each of the peripheral nodes to the adjacent peripheral nodes. The hexagon base 220 is an illustrative embodiment of the present invention and one of skill in the art will appreciate that the shape of the base 220 can be other polygons. For example, the polygon base 220 may be a triangle, a square, a rectangle, a pentagon, etc.

There is a central node near the center of the hexagon base 220 that includes a central tower section 210. The height of the central tower section 210 varies depending on the number of angles in the polygon base. As the number of angles in the polygon base 220 increases, the height of the central tower section 210 decreases. The relationship of height of the central tower section 210 to the number of angles in the base portion is represented below in Table A. Those skilled in the art will recognize that Table A is provided as merely a reference and that the overall total length of the conductive element or wire can vary depending on the area of land available, the size and shape of the antenna and other factors. For example, Table A reflects an overall total conductive element length in the area of forty-five hundred feet, but the dimensions in Table A are scalable, up or down, to accommodate an increase or decrease in the overall total length of the conductive element. One overall total length of the conductive element suitable for practicing the illustrative embodiment of the present invention is about seventy-five hundred feet. Nevertheless, those skilled in the art will recognize that the overall total length of the conductive element varies based on terrain topography and the amount of land available to deploy the system and antenna of the present invention.

TABLE A

| Number of Angles | A (Feet) | B (Feet) | C (Feet) | D (Feet) | Area (Acres) |
|---|---|---|---|---|---|
| 3 | 140 | 480 | 831 | 4,509 | 16.5 |
| 4 | 130 | 470 | 665 | 4,813 | 15.8 |
| 5 | 130 | 460 | 541 | 4,908 | 15.1 |
| 6 | 130 | 450 | 450 | 4,919 | 14.5 |
| 7 | 120 | 450 | 390 | 4,985 | 14.5 |
| 8 | 120 | 440 | 337 | 4,934 | 13.8 |
| 9 | 120 | 430 | 294 | 4,874 | 13.2 |
| 10 | 120 | 430 | 266 | 4,917 | 13.2 |
| 11 | 110 | 420 | 237 | 4,816 | 12.6 |
| 12 | 110 | 410 | 212 | 4,742 | 12 |
| 13 | 110 | 410 | 196 | 4,775 | 12 |
| 14 | 110 | 400 | 178 | 4,702 | 11.4 |
| 15 | 100 | 400 | 166 | 4,682 | 11.4 |
| 16 | 100 | 390 | 152 | 4,603 | 10.9 |
| 17 | 100 | 380 | 140 | 4,527 | 10.3 |
| 18 | 100 | 380 | 132 | 4,558 | 10.3 |
| 19 | 100 | 370 | 122 | 4,485 | 9.8 |
| 20 | 90 | 370 | 116 | 4,431 | 9.8 |

"A" is the approximate height of central tower section.
"B" is approximate distance of radial spokes.
"C" is the approximate distance of peripheral spokes.
"D" is approximate total wire length.

The central tower section 210 can be constructed on a central foundation section 211, for example approximately 40×40×80 (inches) concrete slab, depending on the terrain and local requirements. The central foundation section secures the central tower section 210 in a vertical direction. Exemplary fasteners to couple the central tower section 210 to the foundation section include bolts, screws, various steel bars (with and without threads), and other suitable fasteners.

The central tower section 210 may be constructed using commercially available antenna tower sections, such as free-standing tower sections available from Rohn Industries, Inc., or other suitable supplier. Typically the central tower section 210 is around 100 feet high, and the height of the tower section 210 will vary depending on the type of polygon base, as shown in Table A above.

The central tower section 210 can include a winch mechanism that can hoist the radial spokes 241 through 246 connected to the tower section 210 up to an operating position. The winch mechanism can also lower the radial spokes 241 through 246 to a ground level and allow antenna installation and maintenance to be performed at the ground level. Any of various mechanisms or instruments that can raise and lower the radial spokes connected to the tower section can be used as the winch and one of skill in the art will appreciate that the winch mechanism can include manual and automatic winch mechanisms.

At the vertices of the hexagon base 220, there are peripheral nodes that include peripheral posts 221 through 226. The peripheral posts 221 through 226 are mounted on peripheral foundations, for example concrete slabs, or other suitable foundations. The peripheral posts 221 through 226 may be implemented using three inch diameter plastic pipes. The plastic pipes are exemplary for the peripheral posts 221 through 226 and one of skill in the art will appreciate that the posts 221 through 226 are not limited to PVC pipes and can be implemented by other material, for example, steel, fiberglass, graphite, or other suitable material composition.

The height of the peripheral posts 221 through 226 is lower than that of the central tower section 210, for example about 25 to 30 feet high. The height of these peripheral posts 221 through 226 provides sufficient clearance within the antenna 110 to allow equipment, such as farm equipment, to be used within its inner perimeter of the base portion of the antenna 110. This configuration of the antenna 110 maximizes the usage rate of the land where the antenna 110 is installed.

The peripheral posts 221 through 226 are configurable to include a winch or pulley system that can lower a portion of the radial spokes 241 through 246 and the peripheral spokes 231 through 236 connected to the peripheral posts 221 through 226 to a ground level and allow antenna installation and maintenance to be performed at the ground level. The pulley or winch mechanism includes any of various mechanisms or instruments that can raise and lower a portion of the radial spokes 241 through 246 and the peripheral spokes 231 through 236 connected to the peripheral posts 221 through 226.

The peripheral spokes 231 through 236 connect each of the peripheral nodes to the adjacent peripheral nodes and the radial spokes 241 through 246 connect the peripheral nodes of the polygon base 220 to the central node. The length of the peripheral spokes 231 through 236 and the radial spokes 241 through 246 varies depending on the number of angles in the polygon base 220. As the number of angles in the polygon base 220 increases, the length of the spokes decrease. The approximate length of the spokes is specified in Table A above. One of skill in the art will appreciate that although the above description was for peripheral spokes which form an outermost peripheral ring, there could be any number of concentric rings that could be laid out from the central node out to the peripheral nodes between the fiberglass isolator bars at either end of the radial spokes, forming a lattice similar in shape to a spider web.

The peripheral spokes 231 through 236 and central spokes 241 through 246 consist of a steel cable or wire, for example solid stainless steel wire or stranded stainless steel wire or cable, which is approximately 20 mils or $1/50^{th}$ inch in diameter. The cable is connected to the power source 130 and provided with electric power therefrom. The solid stainless steel cable and the stranded stainless steel cable are exemplary wires for implementing the peripheral spokes 231 through 236 and the radial spokes 241 through 246. One of skill in the art will appreciate that the peripheral spokes 231 through 236 and the radial spokes 241 through 246 are not limited to the stainless steel cable or wire, solid or stranded, and can be implemented by other types of solid or stranded wire or cable, for example, copper or aluminum. Similarly, one of skill will appreciate that the diameter of the cable is not limited to a 20 mil dimension and that other dimensions are suitable for practicing the present invention.

The radial spokes 241 through 246 are connected to the central tower section 210 through insulating fiberglass bars 250G through 250L at the central tower section 210. The insulating bars 250G through 250L not only insulates the radial spokes 241 through 246 from the central tower section 210 but also reduce the potential canceling effect of adjacent coronas surrounding each of the radial spokes 241 through 246 at the central tower section 210. The other end of the radial spokes 241 through 246 are connected directly to the peripheral spokes 231 through 236, since there is minimal corona canceling effect because the angles approach 90 degrees so that the junction acts very much like a "T" junction. The peripheral spokes 231 through 236 are also connected to the peripheral posts 221 through 226 through insulating fiberglass bars 250A through 250F.

There may be an equipment shed 260 that houses the power supply or supplies and also houses the control unit(s). The power supply feeds electrical power to a peripheral spoke, 232 in this example, and, consequently, to the entire group of conducting elements of the antenna 110, through a power output cable 261.

The antenna of the present invention requires a smaller amount of land than an antenna formed of a substantially straight single long wire strand, or an "L" or "T" shaped antenna and further increases ionization and power efficiency by reducing an attenuation factor known to reduce ionization. Also, the present invention simplifies installation and maintenance of the antenna due to the smaller distances involved.

EXAMPLES

An experiment was conducted by installing and operating an ionization station. The ionization station was operated in several modes: Positive (positive voltage), Negative (negative voltage) and Non Operational (zero voltage, the station was turned off). The goal of the experiment was to determine what, if any, the effect or effects of the station would be on the surrounding atmosphere.

Equipment and Resources

Ionization Station

1. High Voltage, Direct Current Power Supplies. Two supplies were used. The first was made by Matsusaka Corp. of Japan, Model AU-120R10, with manually switchable polarity (positive or negative), 0 to 120,000 volts, 0 to 10 miliamperes. The other power supply was a Spellman High Voltage Electronics Corp. SL 80P150/230, positive polarity, 0 to 80,000 volts, 0 to 2 miliamperes.

2. Antenna. The configuration included a 120' tall guyed central tower (25 G) manufactured by Rohn Industries, Inc. designed per EIA/TIA 22-f Standards. Ten 30' tall aluminum flagpoles, bought from American Flag Co, evenly spaced on a circle with a 45' radius from the central tower, were used as peripheral posts. All spokes were 0.024" diameter stainless steel cable. The central tower and all peripheral spokes had a winching mechanism to allow easy installation and maintenance. Fiberglass bars (later replaced by high dielectric strength rope) was used as insulation.
3. Control Unit. The unit was manufactured by Comtrol, Inc., Model 6K Lite with modem.
4. Meteorological data was fed to the 6K-Lite control unit by a commercially available combination thermometer, barometer, anemometer, pluviometer and relative humidity meter.

Other Equipment and Resources

1. Current and archival (historical) weather information including meteorological information, raw weather data and forecasts, satellite imagery, radar imagery, etc., was obtained from multiple websites maintained by the National Oceanic and Atmospheric Administration (NOAA), the National Center for Atmospheric Research (NCAR), the University Corporation for Atmospheric Research (UCAR) and several educational institutions.
2. Real time atmospheric measurements were performed using a modified Piper Comanche 260B configured to transport instruments on both wingtips.
3. Two optical spectrometers manufactured by Grimm Technologies, Inc., Models 1.107 and 1.109, were mounted in custom designed housings that were attached to the Piper Comanche's wingtips. Each spectrometer was equipped with an isokynetic air intake, which was the only part that protruded from the instrument housing, calibrated for the cruise speed of the Comanche, which is 129 knots with the instruments mounted on its wingtips. The spectrophotometers created an aerodynamic drag.

Flight Operations

Figure 3:
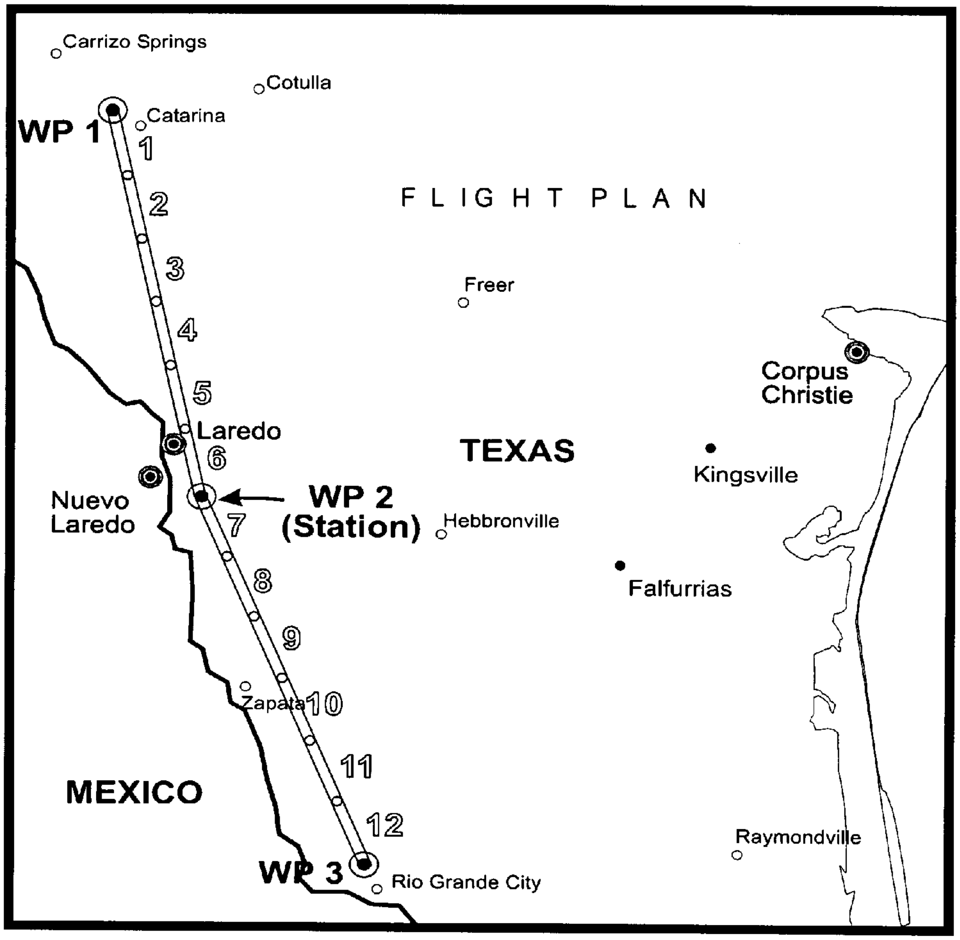
FIG. 3 shows flight plan Alpha.
Figure 4:
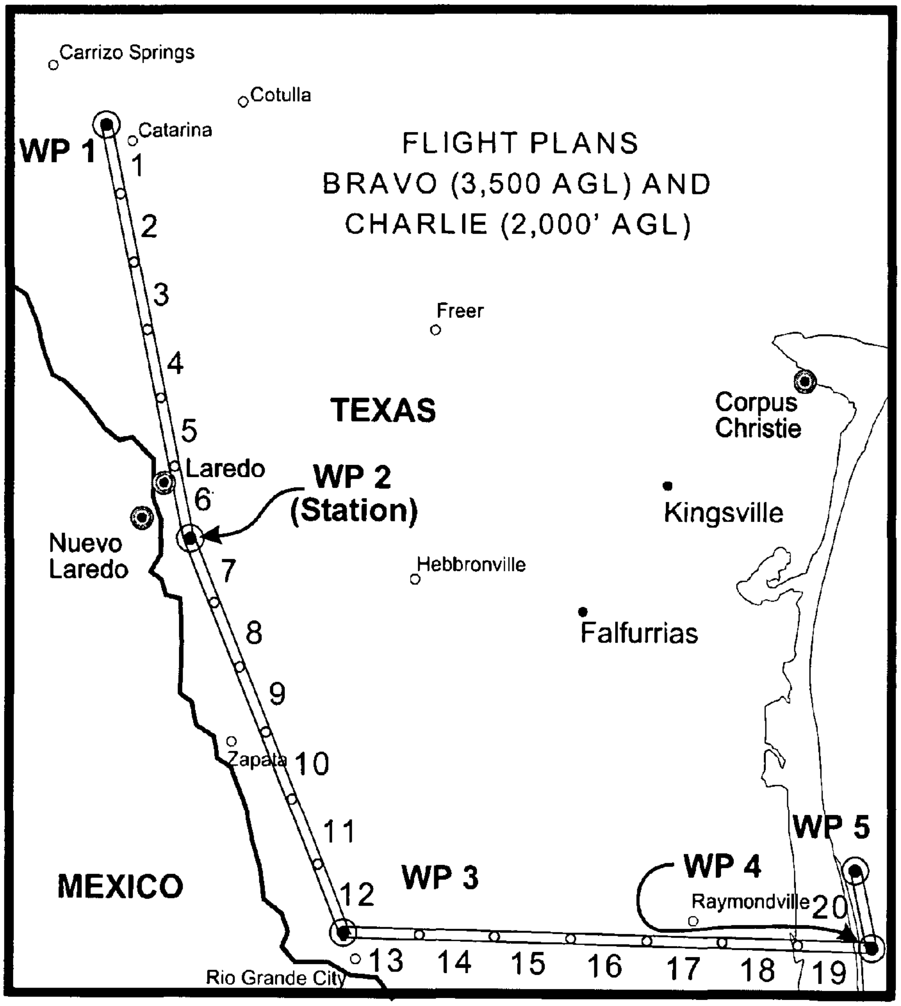
FIG. 4 shows flight plan Bravo.

The basic flight plan (Alpha) is shown in FIG. 3. The aircraft took off from its base, climbed to cruising altitude, typically 2,000 feet above ground level (AGL) or 3,500 feet AGL, which were the flight altitudes most used. It proceeded to Waypoint 1 and then proceeded to the ionization station (Waypoint 2 and then to Waypoint 3. Most times, the plane changed altitude and retraces the route from WP 3 to WP 2 to WP 1 and to base. A few flights had a variation where the airplane would take a course straight East to head for the coast and then return to base. This last variant was only to compare atmospheric conditions in the are of influence of ionization to the atmosphere at the coast. These flight paths were called Bravo which had a flight altitude of 3,500' above ground and Charlie, with a flight altitude of 2,000 above ground. These flight plans are shown in FIG. 4.

The total distance between WP 1 and WP 3 is about 120 nautical miles (WP 1 to WP2 is about 59 nautical miles and WP 2 to WP 3 is about 65 nautical miles). In Bravo or Charlie flights, the distance to the coast is approximately 86 nautical miles.

Measurement Methodology

The objective of the measurement flight program was to determine what influence, if any, the ionization station had on its surrounding atmosphere. The most useful approach to do this is to measure particle counts and to see what patterns develop in terms of particle counts under each operational state: positive, negative or non-operational (zero).

After the first flight it was obvious that we needed to rearrange the data in order to make any sense. The spectrometers measure particle counts in real time every 6 seconds, which means that a flight segment (WP1 to WP2 to WP3) will produce about 600 readouts. Furthermore, they are recording data on 32 channels, one channel for each range of particle size. The overall size range measured by the spectrometers is 0.25 μm (micrometers=$10^{-6}$ meters) to 32 μm. The first two data rearrangements we made were to reduce the number of channels from 32 to 4; in this fashion we only show 'Small' particles (0 to 0.28 μm), 'Medium' particles (0.281 μm to 0.35 μm), 'Large' particles (0.351 μm to 0.800 μm) and 'Giant' particles (0.801 μm to 32 μm). The second rearrangement was that we divided each flight segment (i.e., WP1 to WP2 to WP 3) into twelve flight zones, each about 10 nautical miles long and we took the average reading of the spectrometer for each flight zones, reducing the data points from 600 for the entire segment to 12. Each flight zone is identified in FIG. 3. In the case of Bravo and Charlie flights, we have the ubiquitous 12 flight zones plus another 7 in the track to the coast and an additional flight zone right along the coast.

In all cases, we attempted to wait enough time for the atmosphere to be fully charged by the station (96 hours) or to discharge fully after the station was shut down before we made a measurement flight. We also did not make flights when there was cloud cover within 300 feet of the flight altitude.

The atmospheric and weather conditions for each measurement flight date were analyzed to assure the validity of the data obtained. In all cases satellite images were used to determine optical depth, presence of sulfates, dust and smoke and a backward wind trajectory report was obtained for the approximate time of flight to determine wind direction and velocity at the time and altitude of the flight.

Measurement Results

The results were analyzed in terms of particle (aerosol) size distribution.

Figure 5:
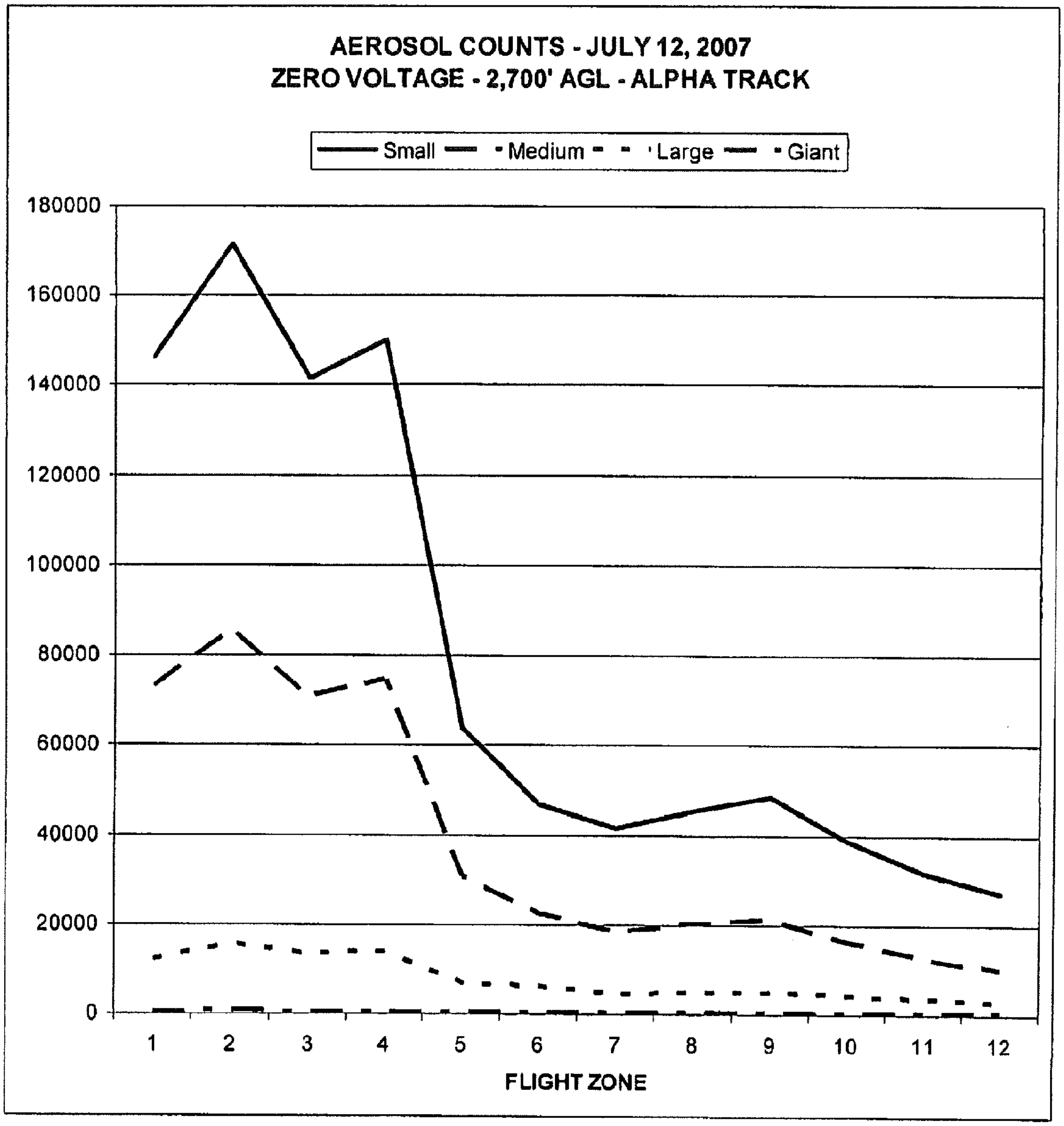
FIG. 5 illustrates the aerosol counts with zero voltage on an Alpha flight plan.

FIG. 5 depicts an Alpha flight pattern with the station having been turned off for more than 4 days. (zero voltage). The ionization station is represented by a small bar between flight zones 6 and 7. In general terms the slope is negative, which means that the aerosol counts are much higher in Zone 1 than in Zone 12.

Figure 6:
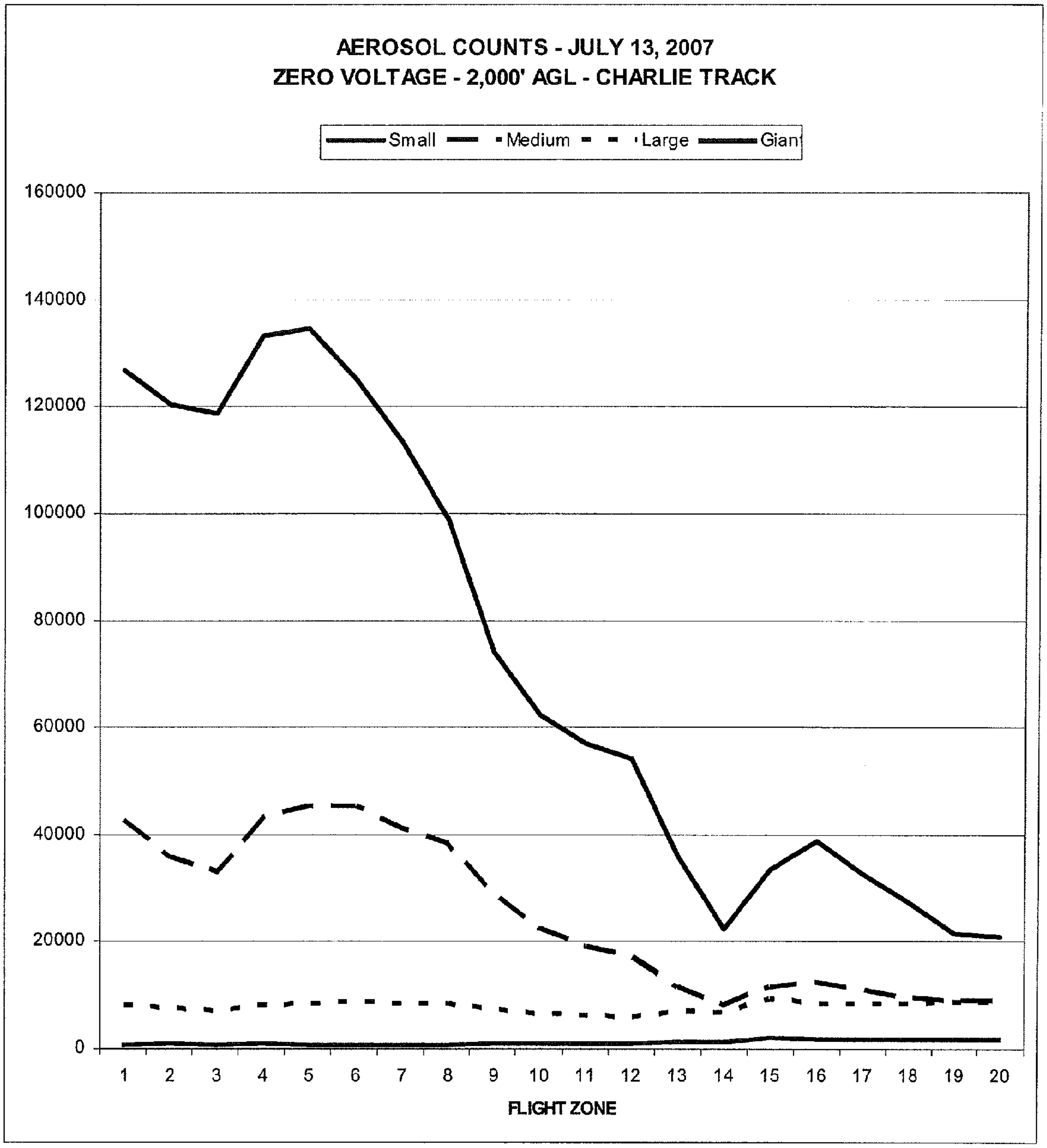
FIG. 6 illustrates the aerosol counts with zero voltage on an Charlie flight plan.

FIG. 6 depicts a Charlie flight pattern. This flight occurred only 1 day after the previous flight. Comparing flight zones 1 through 12 on this flight, there is a great similarity with the previous flight results, namely, negative slope and much greater aerosol concentrations in zone 1 as compared to zone 12. This slope continues as the aircraft turns East toward the coast and aerosol counts drop until the coast is reached. This is natural because maritime atmosphere is typically cleaner than continental atmosphere. The further away from the ocean, the greater the aerosol concentration.

Figure 7:
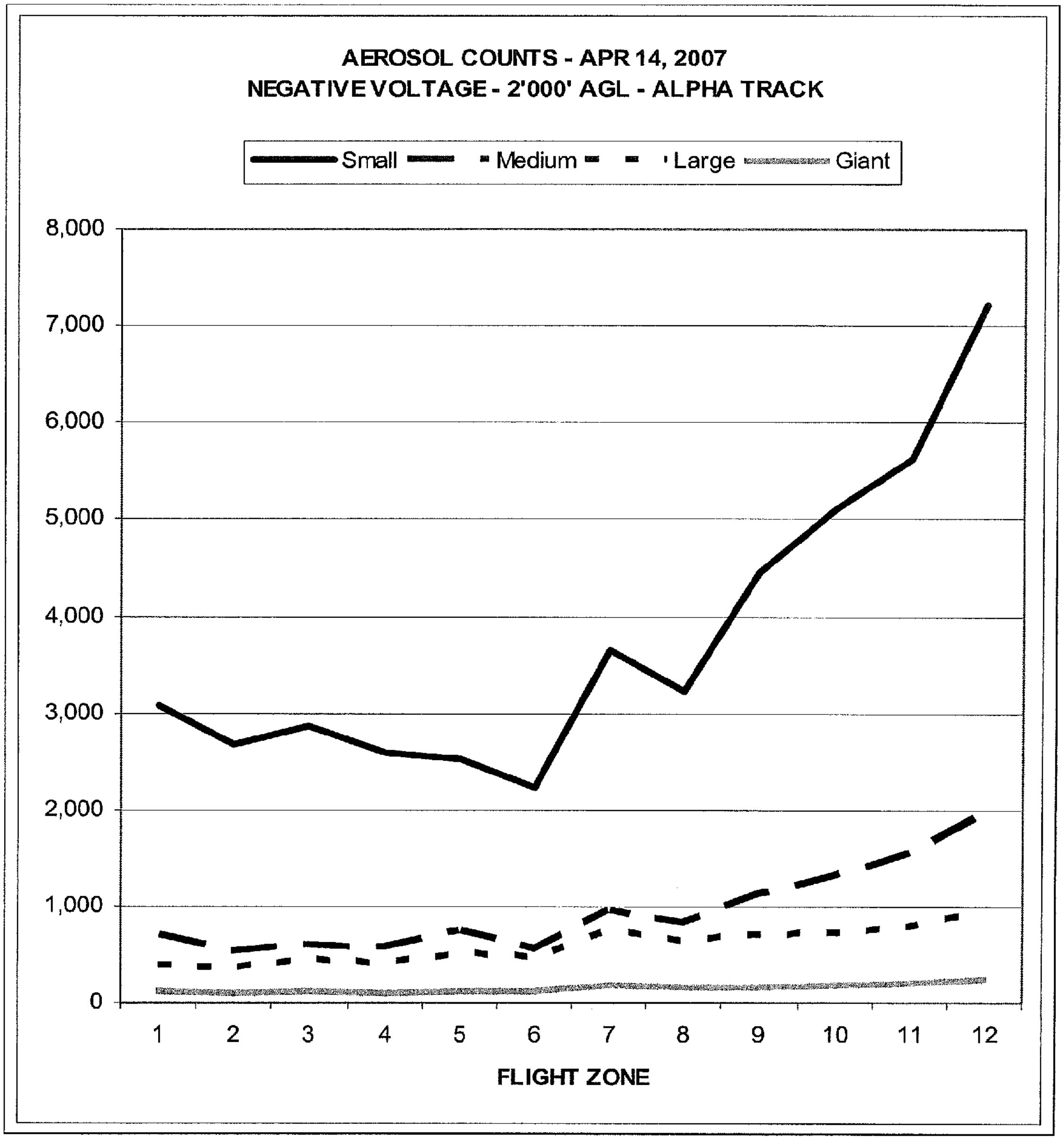
FIG. 7 illustrates the aerosol counts with negative voltage on an Alpha flight plan.

FIG. 7 shows an Alpha pattern flight measuring aerosol counts when the ionization station is producing negative voltage in a negative polarity mode of operation. FIG. 7 shows a totally different picture than the previous two slides. It is clear that the slope is positive and the aerosol counts in zone 1 are much lower than the counts in zone 12.

Figure 8:
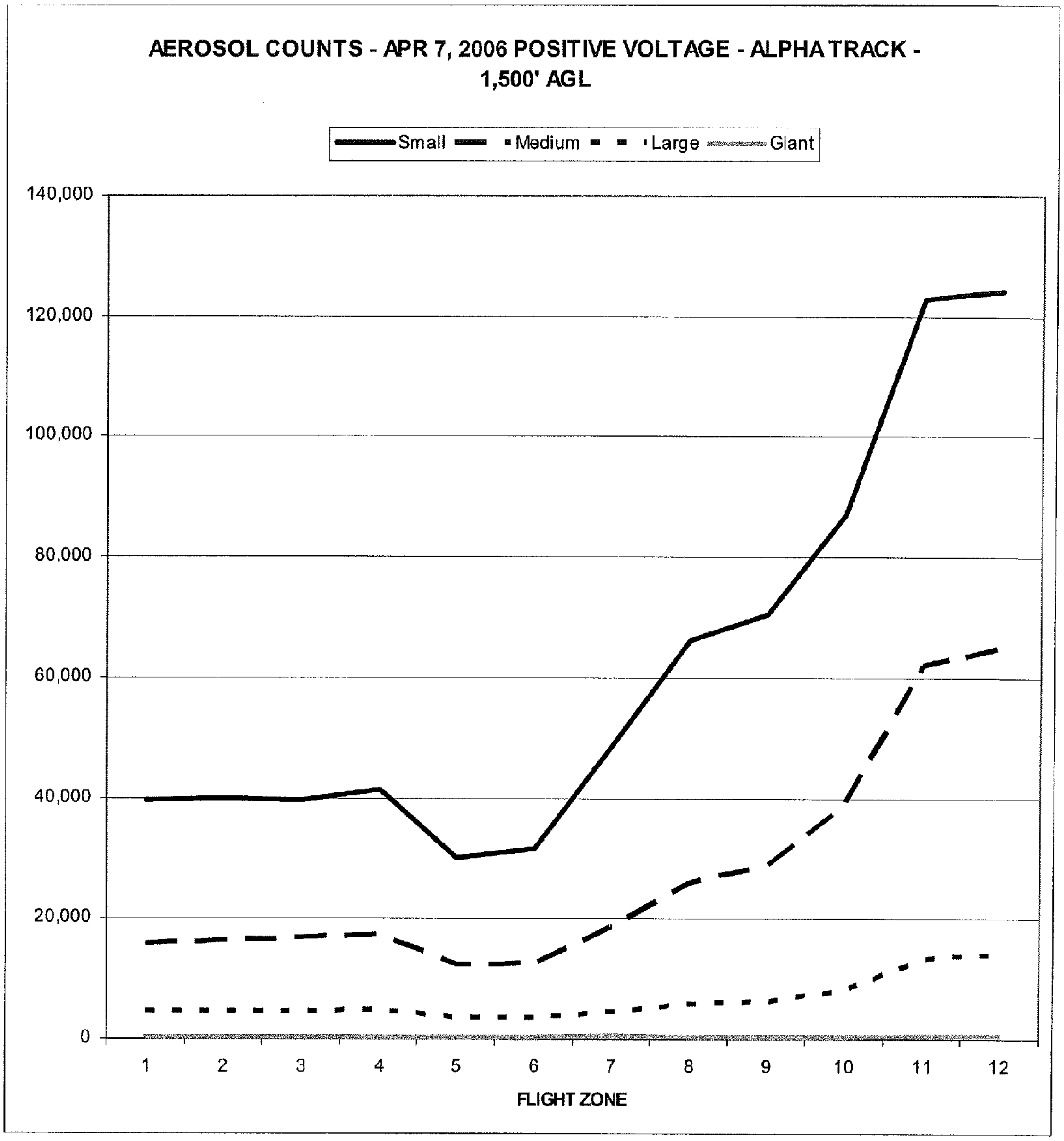
FIG. 8 illustrates the aerosol counts with positive voltage on an Alpha flight plan.

FIG. 8 shows an Alpha pattern flight measuring aerosol counts when the station is operating in positive polarity. The results are similar to the negative polarity operation data shown on FIG. 7, however, the positive slope in the current mode (positive) is slightly steeper than the negative polarity mode data.

Figure 9:
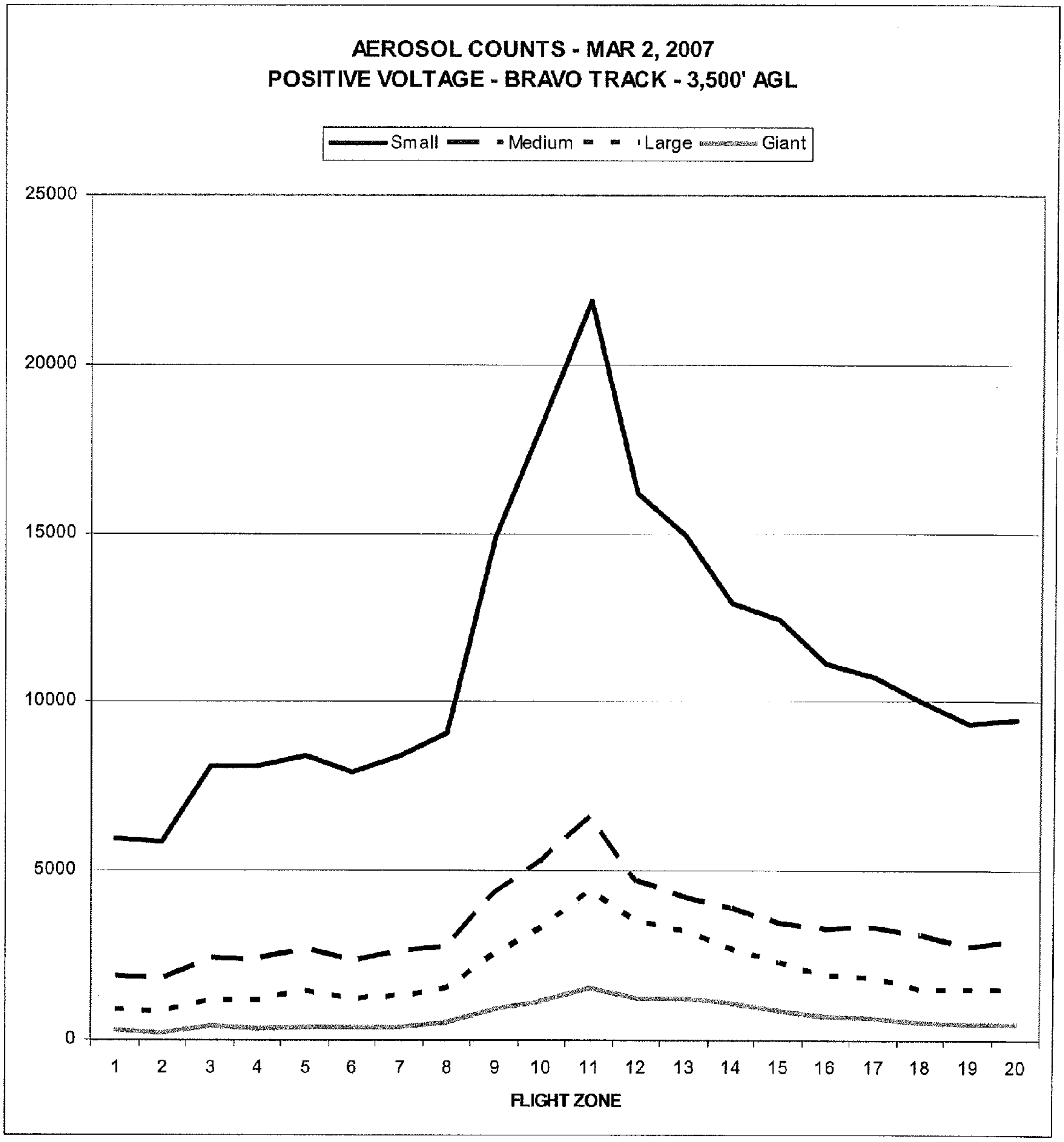
FIG. 9 illustrates the aerosol counts with positive voltage on an Bravo flight plan.

FIG. 9 shows the data measured while the station was operating with positive polarity. This chart clearly shows that on the coast, the aerosol counts are low. They gradually increase the more inland the measurements are taken, until flight zone 11, where there is a very significant, sharp change in slope and the aerosol counts diminish thereafter until, at zone 1 they are even lower than at the coast. This is because the first zone to get measured is zone 1. Zone 20 does not get measured until about an hour and a half later and it is a widely accepted fact that the later in the morning, the higher the aerosol counts due to inversion.

Figure 10A:
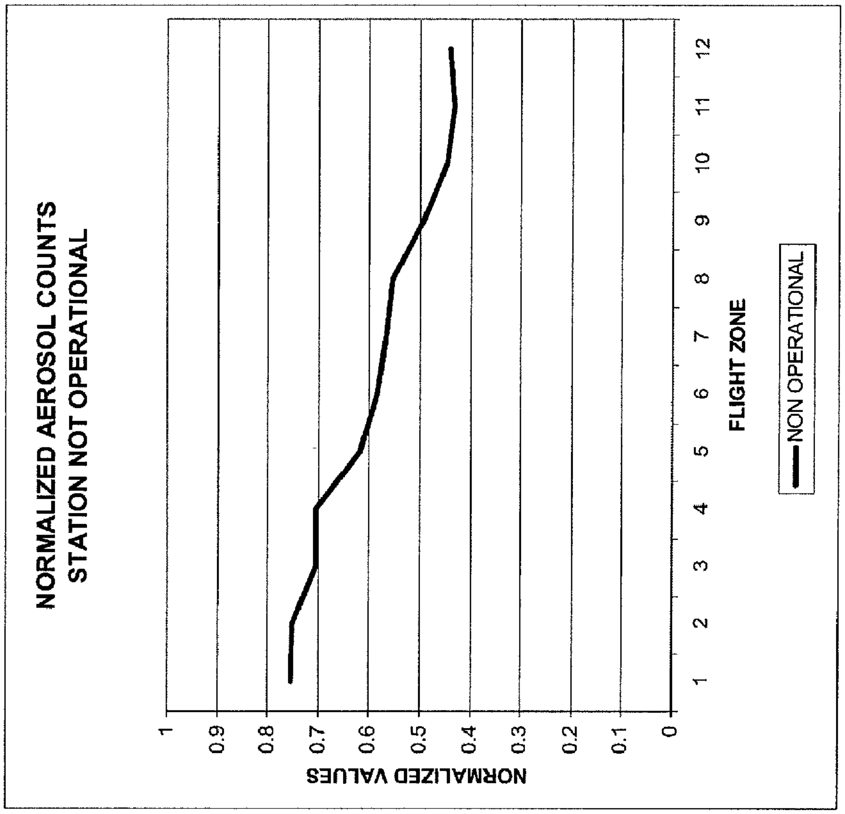
FIG. 10A and FIG. 10B illustrates the normalized aerosol counts with zero voltage on an Alpha flight plan.
Figure 10B:
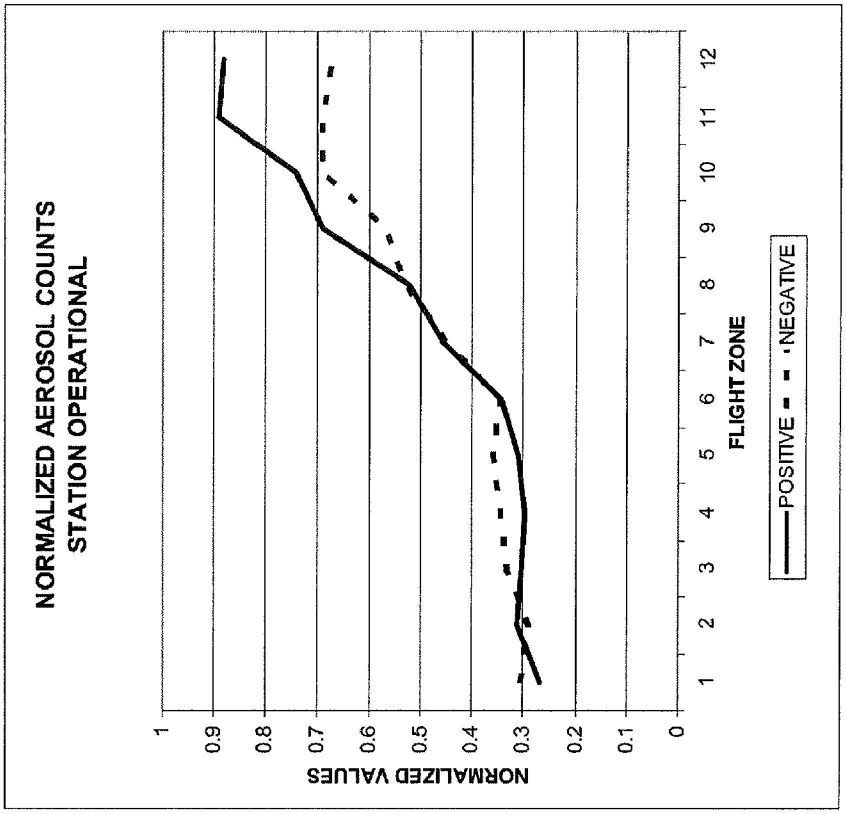

FIG. 10A and FIG. 10B show the result of data collected from all flight segments between waypoints 1 and 3, under non-operational mode (FIG. 10A) and operational mode (FIG. 10B)—both for negative as well as positive polarity. In order to obtain this figure it was necessary to normalize the flight data, because open atmosphere variability produces overall particle counts with a high degree of variability, with some days exhibiting an average of 5,000 aerosols per liter and other days recording 200,000 aerosols per liter. Normalization is simply using the maximum reading obtained in the 12 flight zones and using that as a reference 1, or 100%. All other readings are expressed as a fraction of 1 or as a percentage. FIG. 10A and FIG. 10B represent a total of 18 segments, of which 4 were negative polarity, 6 were non operational and 8 were positive polarity operation. It is readily apparent that with no operation the slope is negative, while under operational conditions, the slope is positive and a steeper slope is observed for positive operation than for negative. This means that positive operation is more efficient in reducing aerosol counts than negative operation. In positive operation, aerosols are catalyzed to grow and the increased mass increases their vertical velocity to ground due to gravitation. Near ground, positively charged aerosols are further attracted to ground (which has a negative charge) due to electrical attraction. Therefore, aerosol deposition to ground under the positive operational mode is the result of adding electrical deposition to gravitational deposition. In the case of negative operation, total deposition is the result of gravitational deposition less the electrical repulsion of negative aerosol by the negatively charged ground.

Figure 11:
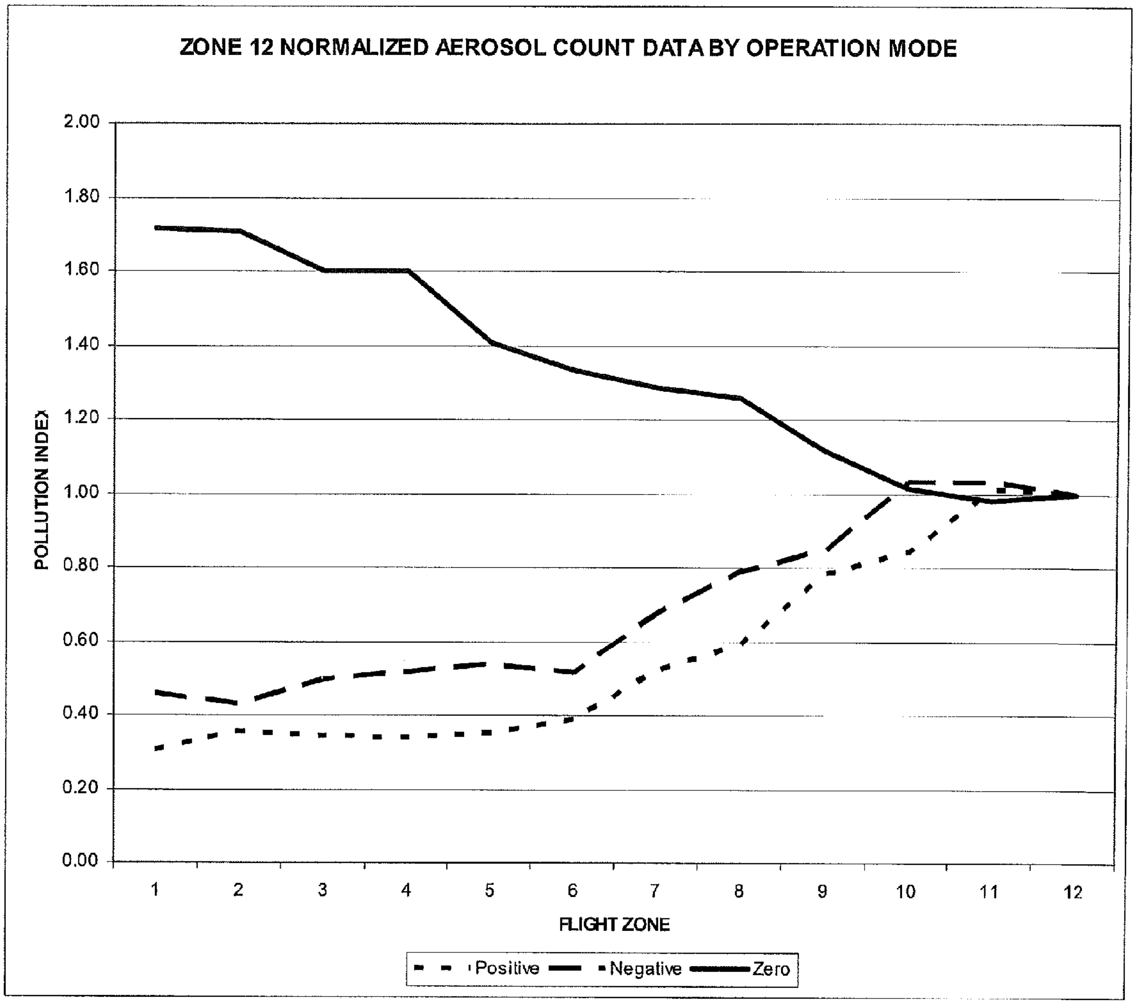
FIG. 11 illustrates the normalized aerosol counts with zero, positive and negative voltage on an Alpha flight plan.

In order to view the full impact of the capability of the ionization station to reduce the aerosol counts, FIG. 11 shows the curves depicted in FIG. 10A and FIG. 10B, but we now normalized so that the value for Zone 12 is the same for all three operational states: positive, negative and zero. The curve for zero operation (non operational) shows that the aerosol counts go from an index of 1 in zone 12 and they gradually increase to approximately an index of 1.7. When the operational state is negative, the zone 12 index of 1 decreases to about 0.5 and when the station operates in positive mode the index in zone 1 decreases to about 0.3. In other words, the station, operating in positive mode, decreases what would be a normal index of 1.7 to 0.3, which means that it is reducing the aerosol count by a factor of almost 6 to less than 20%. This is equivalent to saying that the ionization station is removing aerosols from the atmosphere by deposing them to ground with an efficiency of over 80%. In negative mode, the efficiency drops to about 70% due to Earth's electrical repulsion of negatively charged aerosols.

Although the subject invention has been described with respect to preferred embodiments, those skilled in the art will readily appreciated that changes or modifications thereto may be made without departing from the spirit or scope of the subject invention as defined by the appended claims.

INCORPORATION BY REFERENCE

The entire contents of all patents, published patent applications, and other references cited herein are hereby expressly incorporated herein in their entireties by reference.

References

1. Vonnegut, et al, 1962: Artificial Modification of Atmospheric Space Charge, J. of Geophys. Res., Vol 67, No 3, 1073
2. Svensmark, Friis-Christensen, 1997: Variation of Cosmic Ray Flux and Global Cloud Coverage, J. Atm. Terr. Phys., 59, 1225-1240.
3. Carslaw, Harrison, Kirkby, 2002: Cosmic Rays, Clouds and Climate, Science, 298, 1732-1737.
4. Marsden, Lingenfelter, 2003: Solar Activity and Cloud Opacity Variations, J. Atm. Sci., 60, 626-636.
5. Harrison, R, G, 2001; Atmospheric Electricity and Cloud Microphysics; Proceedings of the Workshop on Aerosol-Cloud Interactions, CERN, Geneva, 14 pp.
6. Nadykto, Yu, 2003: Uptake of neutral vapor molecules by charged clusters/particles: Enhancement due to dipole-charge interaction, J. of Geophys. Res., 108, D23, 4717-4723.
7. Tinsley, Yu, 2002: Atmospheric Ionization and Clouds as Links Between Solar Activity and Climate, http://www.utdallas.edu/dept/physics/Facultv/tinsley/Atmos 060302.pdf
8. Yu, Turco 2001: From molecular clusters to nanoparticles, J. Geophys. Res., 106, D5, 4797-481.
9. Harrison, Carslaw, 2003: Ion-Aerosol-Cloud Processes in the Lower Atmosphere, Rev. of Geophys, 41, 3/1012-1038.
10. Paris, Laan, Valtna, 2002: Laser Ablation and Aerosol Particles, Proc. Hakone VIII, 405-409, p. 7.3

I claim:

1. A ground-based antenna for reducing the aerosol counts in the atmosphere at a distance from said antenna through electrification and ionization of particulates in the atmosphere at a distance from said antenna and deposition to ground of the ionized particulates, the antenna comprising:

a plurality of peripheral nodes mounted on peripheral posts installed on foundations attached to the ground;

a central node located within the plurality of peripheral nodes, said central node being mounted on a central tower attached to the ground, said central node having a greater height above the ground than said peripheral nodes;

a plurality of peripheral spokes for connecting each of the peripheral nodes to adjacent peripheral nodes;

a plurality of radial spokes for connecting the peripheral nodes to the central node; and;

a direct current, high voltage power supply associated with said antenna provides the plurality of peripheral and radial spokes with the selected power signal to induce said antenna to ionize the atmosphere through corona effect and reduce the aerosol counts through deposition to ground;

wherein said central node and said peripheral nodes are electrically isolated from the ground.

2. The antenna of claim 1 wherein said antenna is capable of electrically charging the atmosphere for reducing the aerosol counts through deposition to ground, upon application of a selected, steady state power level having a voltage value of between about zero volts and about positive 500 kilovolts and between about zero volts and about negative 500 kilovolts and having a current value of between about zero and about five amps.

3. The antenna of claim 1 wherein the central node comprises:

a central base portion; and a central vertical member coupled to the base portion.

4. The antenna of claim 3 wherein the central vertical member includes a mechanism for bringing the radial spokes connected to the central node from a first position to a second position.

5. The antenna of claim 1 wherein each of the plurality of peripheral nodes comprises:

a peripheral base portion; and a peripheral vertical member coupled to the peripheral base portion.

6. The antenna of claim 5 wherein each of the peripheral vertical members includes a mechanism for bringing the peripheral spokes and the radial spokes connected to the peripheral node from a first position to a second position.

7. The antenna of claim 1 wherein the radial spokes and the peripheral spokes are formed from a medium for conducting electricity.

8. The antenna of claim 1 further comprises an isolator coupled to the central node and extending radially to electrically isolate the central node from each of the plurality of radial spokes; and an isolator coupled to each of the peripheral nodes and extending radially to electrically isolate each of the peripheral nodes from each of the plurality of radial spokes and each of the plurality of peripheral spokes.

9. A ground-based system for electrically charging the atmosphere by corona effect ionization, the system comprising:

a ground-based antenna having a polygon base portion;

a direct current, high voltage power supply for providing electric power to the antenna;

a control unit for controlling the power source a plurality of peripheral nodes;

a central node spaced apart from each of the plurality of peripheral nodes to form an inverted cone-like shape, similar in geometry to a circus tent;

a plurality of peripheral spokes for connecting each of the peripheral nodes to adjacent peripheral nodes; and a plurality of radial spokes for connecting the peripheral nodes to the central node, wherein the antenna radiates a corona effect electric field to ionize the atmosphere at a distance from said antenna.

10. The system of claim 9 wherein the control unit controls the power supplied to the antenna from the power source in order to reduce the aerosol counts through deposition to ground.

11. The system of claim 10 wherein the control unit controls the power supplied to the antenna from the power supply in order to reduce the aerosol counts through deposition to ground.

12. A method for reducing the number of aerosols in a portion of the atmosphere at a distance from an antenna, the method comprising the steps of:

providing a ground-based antenna that includes a plurality of peripheral nodes, a plurality of peripheral spokes, a plurality of radial spokes, and a central node, said central node having a greater height above the ground than said peripheral nodes; and applying direct current electric power to the peripheral spokes and to the radial spokes to ionize the atmosphere by corona effect;

whereby the number of aerosols in said portion of the atmosphere at a distance from said antenna is reduced.

13. The method of claim 12 further comprising the step of controlling the electric power applied to the plurality of radial and peripheral spokes.

14. The method of claim 12 wherein the step of applying electric power comprises the step of supplying the peripheral spokes, the radial spokes and the with a voltage that induces a corona effect discharge on the peripheral and radial spokes.

15. The method of claim 12 wherein the radial spokes are connected to the central node at one end and to the peripheral nodes at the other end through electrical isolators and the peripheral spokes are connected to each neighboring peripheral node through electrical isolators.

16. The method of claim 13 wherein the step of controlling comprises the step of supplying one of a positive or a negative voltage to ionize the atmosphere by corona effect in order to reduce the aerosol counts through deposition to ground.

* * * * *

UNITED STATES PATENT AND TRADEMARK OFFICE

CERTIFICATE OF CORRECTION

PATENT NO. : 7,965,488 B2
APPLICATION NO. : 11/983631
DATED : June 21, 2011
INVENTOR(S) : Phillip Kauffman It is certified that error appears in the above-identified patent and that said Letters Patent is hereby corrected as shown below:

Title Page, Item (75) Inventor's name should be: "Phillip Kauffman".

Signed and Sealed this
Fourth Day of October, 2011

David J. Kappos
*Director of the United States Patent and Trademark Office*